(12) United States Patent
Mårtensson (10) Patent No.: US 7,798,778 B2
(45) Date of Patent: Sep. 21, 2010

(54) WHEEL FOR A ROTATING FLOW MACHINE

(75) Inventor: Hans Mårtensson, Trollhattan (SE)

(73) Assignee: Volvo Aero Corporation, Trollhattan (SE)

( * ) Notice: Subject to any disclaimer, the term of this patent is extended or adjusted under 35 U.S.C. 154(b) by 640 days.

(21) Appl. No.: 11/719,410

(22) PCT Filed: Dec. 8, 2004

(86) PCT No.: PCT/SE2004/001840

§ 371 (c)(1), (2), (4) Date: May 16, 2007

(87) PCT Pub. No.: WO2006/062451

PCT Pub. Date: Jun. 15, 2006

(65) Prior Publication Data

US 2009/0202353 A1    Aug. 13, 2009

(51) Int. Cl.
*F01D 5/22* (2006.01)

(52) U.S. Cl. .................. 416/190; 416/228

(58) Field of Classification Search .......... 415/227, 415/228, 173.6; 416/189, 87, 195, 214 R, 416/214 A, 204 R, 204 A, 62, 194, 169 A, 416/169 R, 228, 2, 190; 29/889.3

See application file for complete search history.

(56) References Cited

U.S. PATENT DOCUMENTS

| | | | | |
|---|---|---|---|---|
| 3,034,762 A | | 5/1962 | Fanti et al. | |
| 3,095,138 A | * | 6/1963 | Warnken | 416/190 |
| 3,556,675 A | * | 1/1971 | Howald et al. | 416/190 |
| 3,918,840 A | * | 11/1975 | Haworth et al. | 416/190 |
| 4,398,508 A | * | 8/1983 | Moon et al. | 415/173.3 |
| 4,832,568 A | * | 5/1989 | Roth et al. | 415/189 |
| 5,037,273 A | * | 8/1991 | Krueger et al. | 416/190 |
| 6,223,524 B1 | | 5/2001 | Durcan | |

FOREIGN PATENT DOCUMENTS

| | | |
|---|---|---|
| EP | 1469165 A1 | 10/2004 |
| GB | 835177 A | 5/1960 |

OTHER PUBLICATIONS

International Search Report for corresponding International Application PCT/SE2004/001840.

* cited by examiner

*Primary Examiner*—Richard Edgar
(74) *Attorney, Agent, or Firm*—WRB-IP LLP (57) ABSTRACT

A wheel for a rotating flow machine, comprising a rotor (1) on which a plurality of blades (2) are arranged projecting radially from the rotor (1), with each blade (2) having a root (3) attached to the rotor (1) and a blade top (4). In addition, the wheel comprises a ring (5) arranged concentrically in relation to the rotor (1) outside the blade tops (4) in such a way that the ring (5) and the blades (2) overlap each other when the ring and the blades are viewed in a radial direction, which ring (5) is arranged to be caused to rotate by the blades (2) when the rotor (1) rotates. The extent (9) of the blades (2) in a radial direction and the internal dimension (10) of the ring (5) are matched to each other in such a way that there is a clearance (Δ) between each blade top (4) and the ring (5) in radial direction when the rotor (1) is not rotating.

29 Claims, 7 Drawing Sheets

WHEEL FOR A ROTATING FLOW MACHINE

BACKGROUND AND SUMMARY

The present invention relates to a wheel for a rotating flow machine.

Although the invention is primarily intended to provide a fan wheel, turbine wheel or compressor wheel or the like for use in a gas turbine, such as an aircraft engine, preferably a jet engine, the wheel according to the invention could also be used in a stationary gas turbine for the generation of power or in other rotating flow machines of various kinds. Examples of other flow machines in which the invention could be used are steam turbines, pumps, fans, etc.

Fan wheels, turbine wheels and compressor wheels for gas turbines have a rotor and a plurality of blades that are arranged on the rotor and that extend radially out from the rotor. In order to increase the rigidity of such a wheel and to reduce the tendency to vibrate, according to previously-known technology, discrete structurally-supporting elements in the form of so-called dampers are arranged between the blades, preferably approximately centrally to the blades. On a turbine wheel, structurally-supporting elements or a continuous ring can be arranged at the tops of the blades to join the blades together. Such structurally-supporting elements and rings have, however, the disadvantage that aerodynamic losses arise, the weight of the wheel is increased and the centrifugal forces on the blades and the rotor increase.

A further disadvantage of the use of structurally-supporting elements is that the manufacture of such a wheel is made more complicated, as the structurally-supporting elements must be manufactured and matched to the blades and fitted on the wheel. The use of a continuous ring that is attached at the tops of the blades has the disadvantage that the ring and the blades must be joined together, for example by welding. On a fan wheel, a ring cannot be arranged at the tops of the blades as that would result in too large centrifugal forces when in operation. In addition, it is more difficult to repair the wheel when it is provided with structurally-supporting elements or a ring. In a wheel that does not have a fixed ring and that is provided with so-called removable blades, an individual blade can be removed for repair relatively easily. When the rotor and blades are manufactured as one piece, the fitting of structurally-supporting elements will be made more difficult or impossible, depending upon the profile of the blades.

An alternative to structurally-supporting elements is to arrange a self-supporting outer ring around the blades. By self-supporting ring is meant a ring that does not cause large outward-directed forces on the blades due to centrifugal forces, while at the same time the ring can provide increased stability to the relatively thin blades in the same way as the structurally-supporting elements described above. Such a design is more rigid than a corresponding design that does not have a ring and structurally-supporting elements, which in turn means that resonance frequencies can be avoided. A ring arranged at the tops of the blades results in a larger friction surface between the wheel and the stationary component which results in increased damping and less vibrations. In addition, the ring can be arranged in such a way that it loads the blades radially in the direction towards the rotor which reduces the centrifugal forces acting on the blade and the rotor originating from the blades. Additional advantages of such a ring are that leakage at the tops of the blades can be avoided and that the blades can be made thinner, which reduces losses and makes possible a higher mass flow through the gas turbine. These advantages make it easier to design the blades in an aerodynamic way and thereby improve the performance of, for example, an aircraft engine.

For aircraft engine applications, the ring has, in addition, advantages relating to fulfilling the so-called containment requirement that specifies that if fragments, such as a turbine blade or parts thereof, come loose from the rotor for any reason, such fragments must be retained inside the housing that surrounds the rotor in order to prevent the fragments from damaging other parts of the aircraft. By means of the ring, the force from such fragments can be distributed in an advantageous way and the fragments can be prevented from penetrating the surrounding housing in a radial direction. In addition, the use of a ring means that in the event of a collision with a bird, the force from such a collision will be distributed over a larger number of blades, so that the blade is not brought into contact with adjacent stators as a result of deformation.

A self-supporting ring for rotating units in gas turbine engines is described in U.S. Pat. No. 6,223,524. A rotating unit has a rotor provided with a plurality of blades that extend radially from the rotor and a ring that is arranged around the blades. The ring and the blades are attached with a push fit between the ring and the blades in a radial direction when the rotor is not rotating. The push fit is of the order of 0.01-0.1" and is intended to provide a maximal engagement between the blades and the ring when mounting the ring on the rotor, that is in the stationary state when the rotor is not rotating, and a minimum permitted engagement between the blades and the ring during operation. The abovementioned disadvantages associated with manufacture and repair also apply, however, to a certain extent for a rotating unit that has a self-supporting ring of the type that is described in U.S. Pat. No. 6,223,524. Such a design makes high demands of precision in the manufacture of the individual components and also when assembling these into a unit in order to obtain the required push fit between the blades and the ring. In addition, maintenance and repair of the blades is made more difficult as a result of the fact that, when dismantling and subsequently refitting the ring, the push fit must be eliminated and subsequently recreated, and contact surfaces must be inspected.

It is desirable to provide a wheel for a rotating flow machine, preferably a gas turbine, of the type defined in the introduction, that can combine the advantages of a self-supporting ring while, at the same time, the wheel is relatively simple to manufacture and repair.

With the use of a ring arranged concentrically in relation to the rotor outside the tops of the blades so that the ring and the blades overlap each other when the ring and the blades are viewed in a radial direction, which ring is arranged to be caused to rotate by the blades when the rotor rotates, it is thus the case that no clearance is required between the tops of the blades and a stationary component in order to permit rotation of the wheel. Instead, the outside of the ring will rotate in relation to a stationary component, and the requisite gap between the outside of the ring and such a stationary component, which gap is arranged in order to permit a certain radial expansion of the wheel during operation, can be reduced considerably in comparison to the clearance that is otherwise required between the tops of the blades and the stationary component. The seal between the ring and stationary component can be made more efficient in comparison to the case when the tops of the blades are to form a seal against a stationary component. By means, for example, of a comb seal, the clearance can be reduced and also the geometry of the seal can be improved.

As a result of the extent of the blades in a radial direction and the internal dimension of the ring being matched to each other in such a way that there is a clearance between the tip of each blade and the ring in a radial direction when the rotor is not rotating, the rotor and blades on one hand and the ring on the other hand will be components that can be separated when in an unloaded state. Thus, the ring can be both assembled and dismantled, if necessary, in a relatively simple way.

By the use of the ring according to the invention, it should also be easier to design the wheel so that required forces between the blades and the ring are obtained in the hot state during operation in comparison to a ring that has a gripping fit on the blades as soon as it is assembled. By the selection of the size of the initial clearance, the gripping force during operation, and in particular during maximum speed of revolution of the wheel, can be controlled to be a required value.

In addition, the invention relates to an aircraft engine comprising a wheel according to the invention.

Other advantageous characteristics and functions of various embodiments of the invention are apparent from the following description.

BRIEF DESCRIPTION OF DRAWINGS

Below follows a detailed description of exemplary embodiments of the invention, with reference to the attached drawings.

In the drawings.

DETAILED DESCRIPTION

Figure 1A:
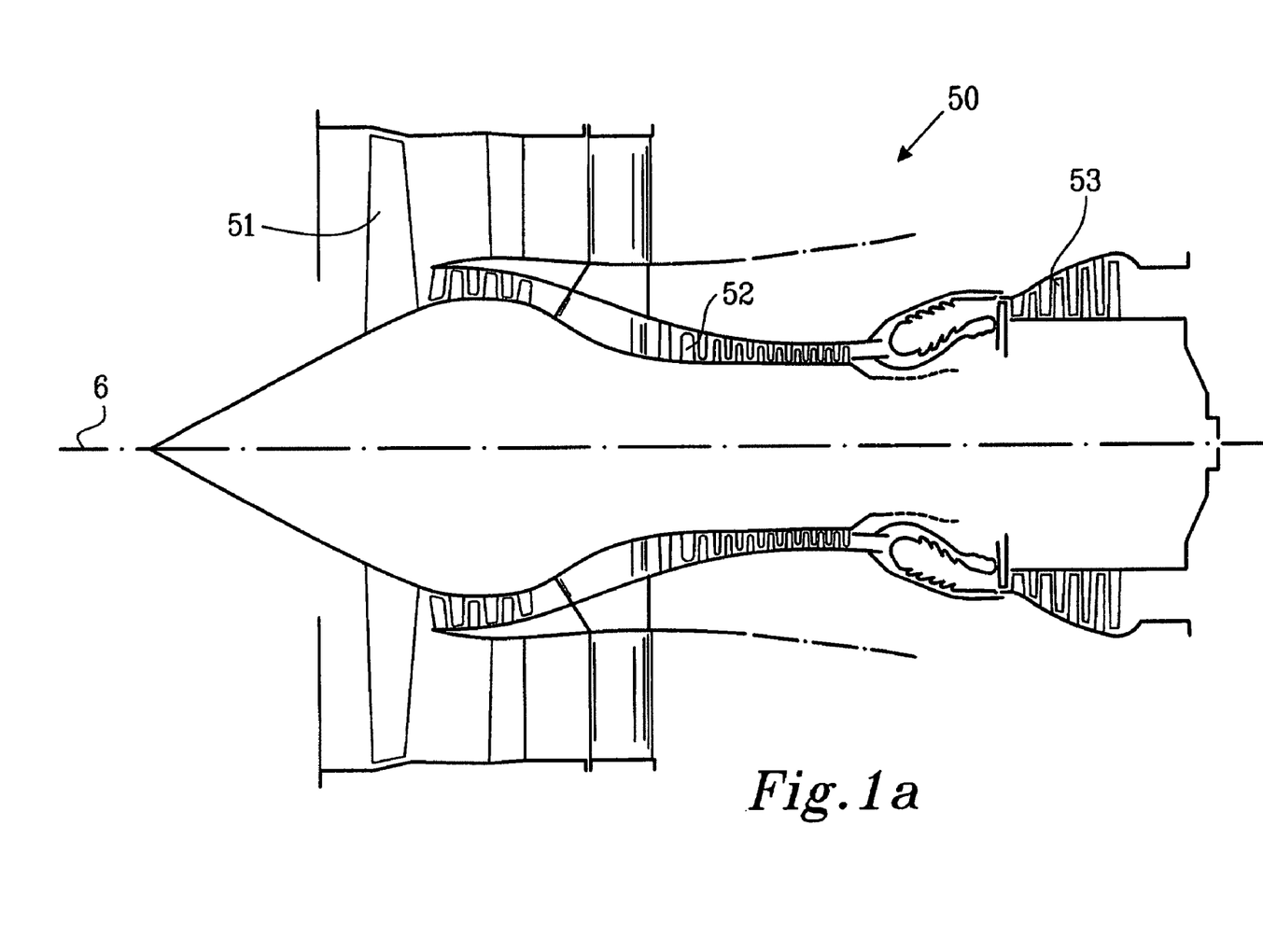
FIG. 1a is a schematic sectioned view of a gas turbine engine.
Figure 1B:
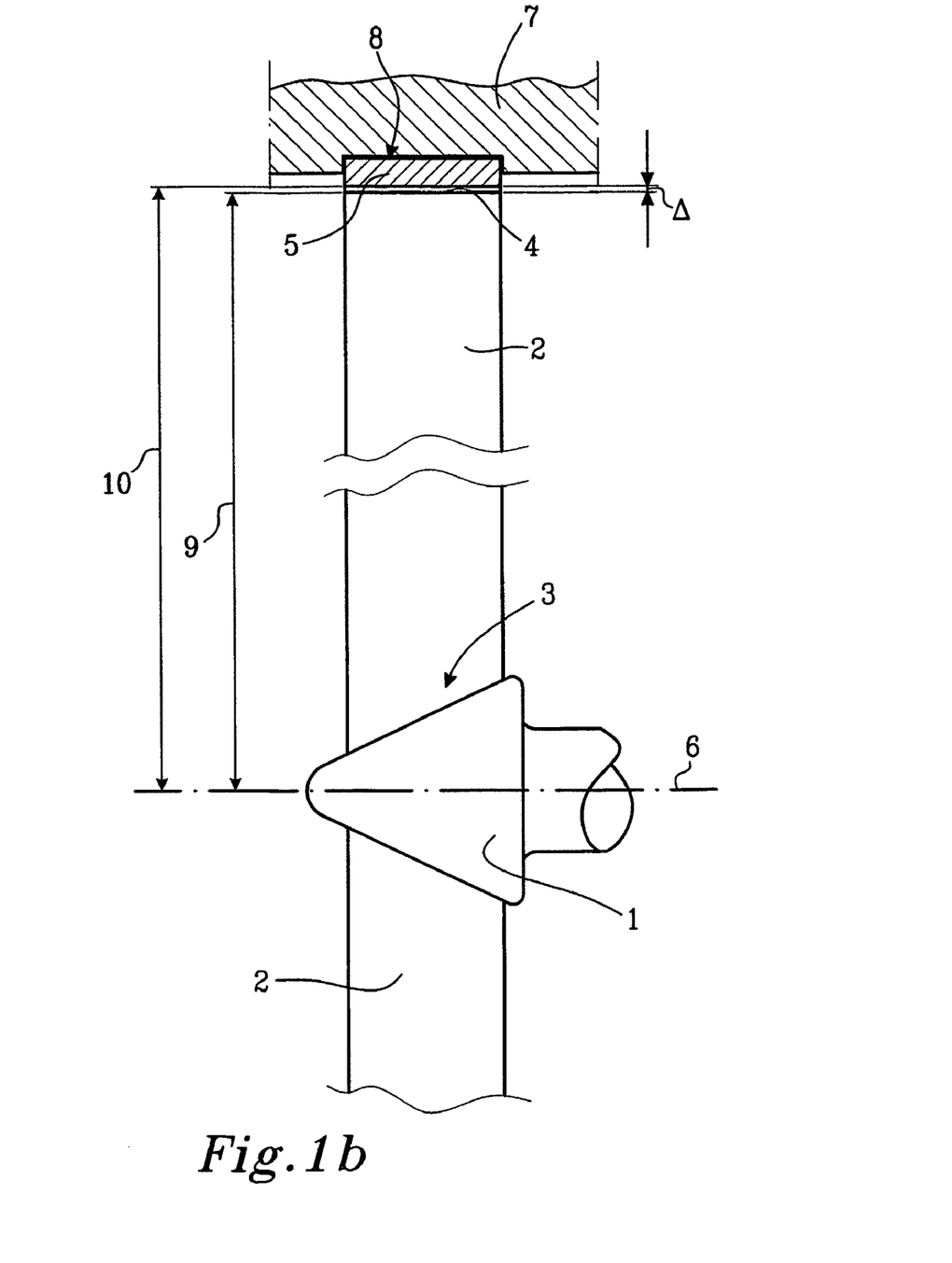
FIG. 1b is a partially sectioned side view of a wheel according to the invention.

FIG. 1a illustrates schematically a gas turbine engine 50 in cross-section along the central axis 6 of the gas turbine. The gas flow is from left to right in the drawing. The invention can be utilized for various kinds of wheels, such as fan wheels 51, compressor wheels 52 and/or turbine wheels 53. FIG. 1b illustrates a wheel according to the invention that comprises a rotor 1. The rotor can be a disk or a tube or the like. A plurality of blades 2 are arranged on the rotor 1 projecting radially from the rotor 1. Each blade 2 has a root 3 attached to the rotor 1 and a blade top 4. The blades and the rotor can be manufactured in one piece or the blades can be attached to the rotor permanently or in such a way that they can be removed. In addition, the wheel comprises a ring 5 arranged concentrically in relation to the rotor 1 outside the tops of the blades 4, so the ring 5 and the blades 2 overlap each other in a radial direction. This means that the ring 5 and the blades 2 overlap each other when the wheel is viewed from a position external to the wheel in a radial direction inwards towards the centre of the wheel and at right angles to the geometrical longitudinal axis 6 of the wheel that extends in an axial direction. The geometrical longitudinal axis 6 coincides with the wheel's axis of rotation. The ring 5 is arranged to be caused to rotate by the blades 2 when the rotor 1 rotates. The wheel is arranged to rotate in relation to a stationary component 7. More specifically, the external surface 8 of the ring constitutes a surface in the interface with the stationary component 7.

The extent 9 of the blades 2 in a radial direction and the internal dimension 10 of the ring 5 are matched to each other so that there is a clearance δ between each blade top 4 and the ring 5 in a radial direction when the rotor 1 is not rotating. When the ring has an internal circular delimiting surface located just outside the tops of the blades, the radius that defines this delimiting surface on the ring is larger than the distance between the geometrical longitudinal axis 6 and the outermost tip of each blade top 4. This means that the rotor 1 with blades 2 on one hand and the ring 5 on the other hand are components that can be dismantled relatively easily in an unloaded state (and at room temperature). The choice of the size of the clearance δ will be controlled by, among other things, dimensions of the wheel and what materials are used in the ring 5 and in the blades 2. The clearance δ between each blade top and the ring suitably exceeds 5 μm, often 10 μm, and preferably exceeds 30 μm, when the rotor and the ring are arranged concentrically in relation to the center of rotation. The clearance δ is often less than 100 μm. These values are relevant at least in the case of a rotor with a diameter of the order of 200 mm.

In the case when the ring is caused to rotate by tangential contact between the blade tops and the ring, and when, even during operation of the wheel, there is a clearance in a radial direction between the tops of the blades and the ring, there is actually no upper limit for the size of clearance, which in such a case can be of the order of millimeters or tenths of a millimeter.

By the choice of material and dimensions, the wheel can be designed in such a way that contact arises between the tops of the blades 4 and the ring 5 in a radial direction at a predetermined speed of rotation of the wheel. When the wheel rotates, the clearance δ will thus reduce with increased speed of rotation and, for a particular speed of rotation when the clearance δ has been eliminated, a contact force will arise between each blade 2 and the ring 5. When such a radial contact force arises between the blade tops 4 and the ring 5, this means that there is a radial engagement between the ring 5 and the blades 2 corresponding to a gripping fit. By the choice of material and dimensions, the expansion of the blades 2 and the ring 5 during operation can be determined and matched so that a requisite contact force, or rather a requisite engagement, is obtained between the blades 2 and the ring 5 in a radial direction in the required range of speeds of rotation. The wheel is preferably designed in such a way that at the highest speed of rotation, there is the greatest radial contact force between the blades 2 and the ring 5. By means of the radial engagement, a part of the force or the whole force that is needed to cause the ring 5 to rotate is transferred from the blades 2 to the ring 5 when the wheel rotates.

The expansion of the blades in a radial direction during operation depends upon the speed of rotation of the rotor and the temperature, in addition to blade dimensions and material in the blade. The blade tops can thus move in relation to the ring by each blade being lengthened somewhat as a result of centrifugal forces and thermal expansion. In another embodiment, however, the blades could be arranged to move in a radial direction in relation to the rotor in such a way that the blades are arranged to move radially outwards in relation to the rotor, rather than being lengthened, when this rotates.

Figures 2A, 2B:
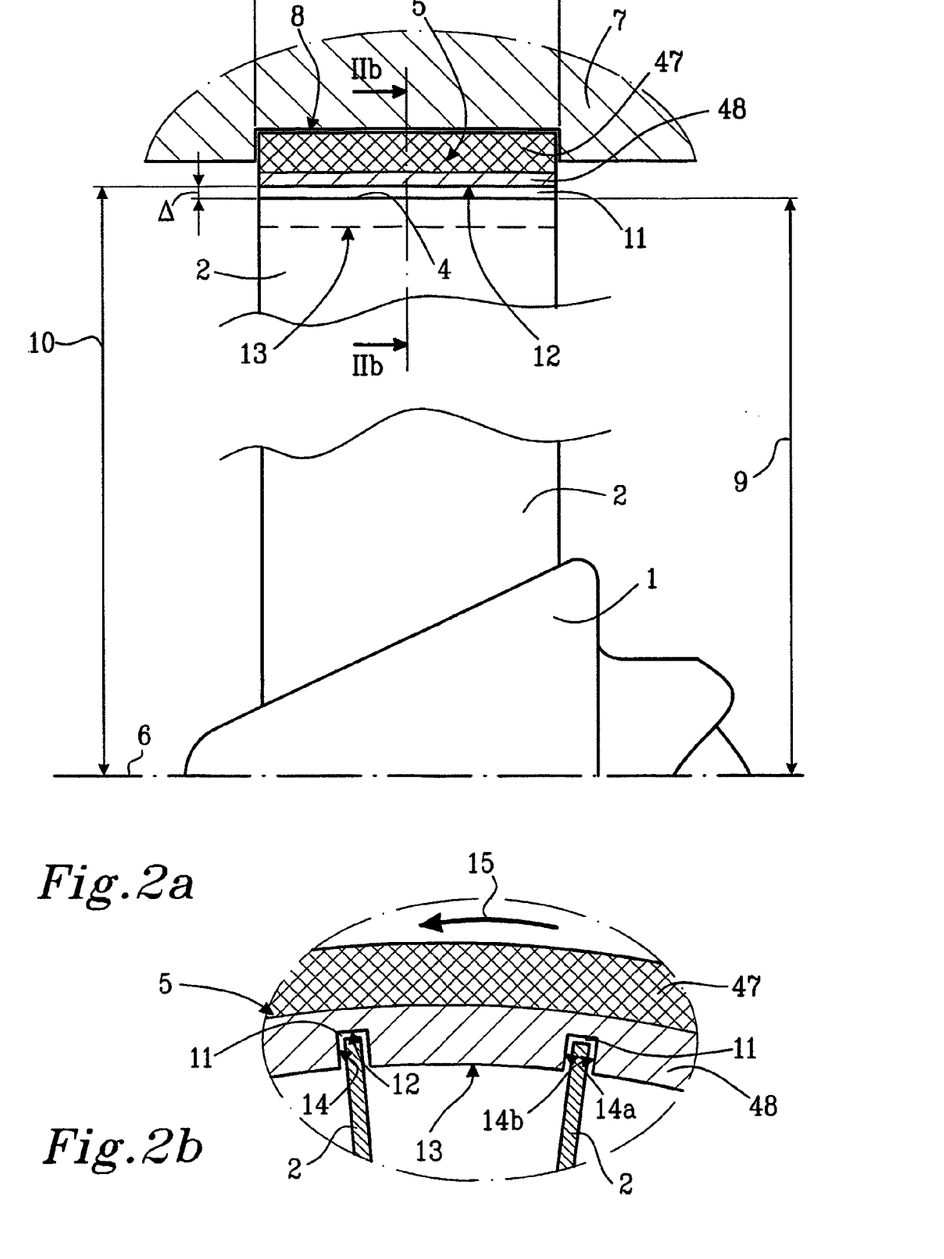
FIG. 2a is an enlarged partial view corresponding to FIG. 1 of a wheel according to the invention comprising a ring provided with recesses for receiving blades.
FIG. 2b is a sectioned view along the line lib-lib in FIG. 2a, FIG. 3a is a view corresponding to FIG. 2b that shows a variant of the invention.

In a preferred embodiment of the invention illustrated in FIGS. 2a and 2b, the ring 5 is provided with internal recesses 11 to receive the blade tops 4 in various positions around the circumference of the ring 5 and for the transference of force between the blade tops 4 and the ring 5. FIG. 2b, which is a section of FIG. 2a, shows two of these recesses 11 arranged in the ring 5. The ring 5 has a distance 10 between the geometrical longitudinal axis 6 and a bottom surface 12 of each recess 11 that, when the wheel is stationary, exceeds the distance 9 between the geometrical longitudinal axis 6 and the blade tops 4 so that the said clearance δ is created. Expressed differently, the bottom surfaces 12 of the recesses 11 are arranged at a larger radial distance from the geometrical longitudinal axis 6 than the blade tops 4. By means of the recesses 11 on the inside 13 of the ring, fixed positions are obtained for the blade tops 4 around the circumference of the wheel. Although there are advantages associated with the illustrated embodiment in which each blade 2 is arranged in a respective recess 11 in such a way that at least a part of the blade top 4 and a side wall surface 14 of the recess overlap each other in a tangential direction when the rotor is not rotating, in another embodiment it is possible for this overlap not to arise until a particular speed of rotation of the rotor has been reached. By an overlap in a tangential direction is meant that a part of the blade top 4 protrudes into the recess 11 in such a way that the blade top 4 and the side wall 14 overlap each other when they are viewed in a tangential direction or, in other words, when they are viewed in the direction of rotation 15 of the wheel. In the case when there is not a tangential overlap when the wheel is stationary, the ring 5 should still be able to be caused to rotate by the wheel as a result of the blades 2 being lengthened as a result of the rotation of the wheel and the occurring temperature by a distance greater than any increase in the internal dimension of the ring 5. A suitable overlap between the blade top and the recess depends upon the dimensions of the blade, such as its thickness, but is often in the range 1-5 mm.

An overlap between a part of the blade top 4 and the side wall surface 14 of the recess 11 when the wheel is stationary ensures that the blades 2 will essentially immediately come into engagement with the ring 5 when the rotor 1 starts, that is the recesses 11 will prevent the rotor/blade unit from slipping in relation to the ring 5. During operation, each blade 2 can be arranged to cause the ring 5 to rotate by contact with the side wall surface 14 of the respective recess 11 and/or contact with the bottom surface 12 of the respective recess 11 when the wheel rotates.

In an embodiment of the invention, see FIGS. 2a and 2b, the recesses 11 could be shaped as rectangular grooves with essentially parallel side surfaces 14a, 14b and a bottom surface 12 that extends essentially at right angles to the side surfaces 14a, 14b. The groove can extend the whole length 16 of the ring 5 or along a part thereof.

Figure 3A:
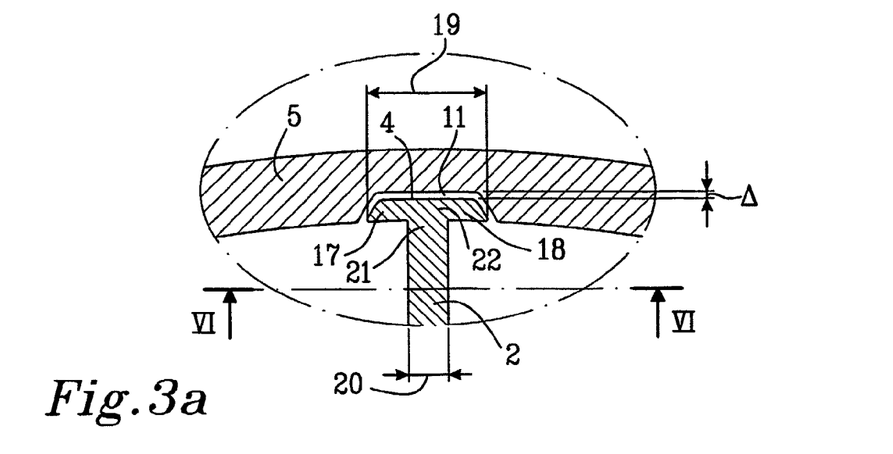
Figure 3B:
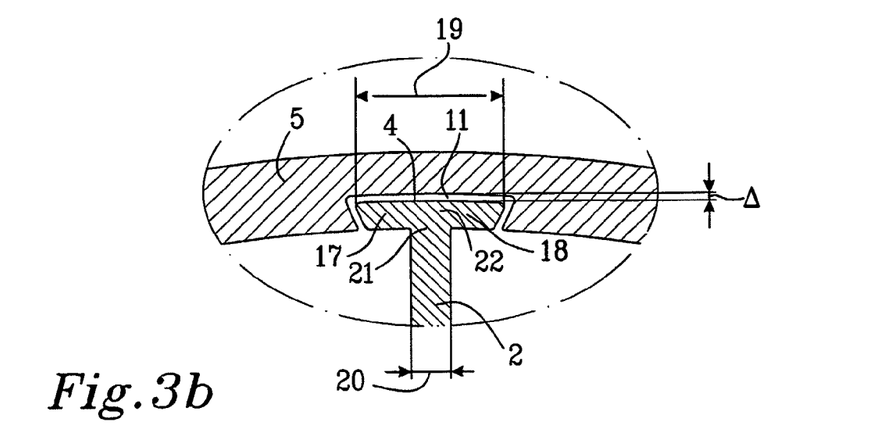
FIG. 3b is a view corresponding to FIG. 2b that shows an additional variant of the invention.
Figure 3C:
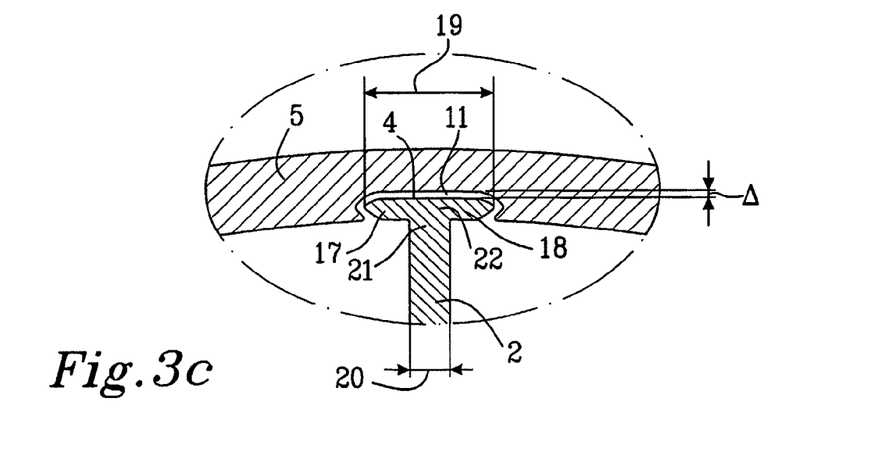
FIG. 3c is a view corresponding to FIG. 2b that shows an additional variant of the invention.

FIGS. 3a, 3b and 3c illustrate as examples some variants of the shapes of the recesses 11 and the blade tops 4 in which the blade 2 has a top 4 with projecting parts 17, 18 which mean that the blade top 4 has a width 19 that exceeds the thickness 20 of the blade, at least in comparison to the thickness of the part 21 of the blade closest to the top. The projecting parts 17, 18 project outwards from the blade 2 in a direction that has a component in a tangential direction. A blade top 4 that is to cause the ring 5 to rotate when the wheel rotates, which blade top is designed with one or two such projecting parts 17, 18 forming a top plate 22, will be strengthened in comparison to a blade top that is essentially the same thickness as the rest of the blade. In order to give the wheel its aerodynamic characteristics, the thickness of the blade is normally relatively small in comparison to the extent of the blade in a radial direction. In addition, such a top plate 22 on the blade top can be used to ensure that a requisite engagement between the blades 2 and the ring 5 can be achieved for causing the ring 5 to rotate when the wheel rotates. For example, the embodiment according to FIG. 3b is effective for maintaining the engagement between the blade top and the ring so that the ring can be caused to rotate when the wheel rotates. This embodiment is able to transfer force between the blades and the ring in a tangential direction even when the ring expands more than the blades expand in a radial direction when the wheel rotates, as the smallest width of the recess is less than the largest width of the top plate, and the width of the recess reduces in a radial direction inwards while the width of the top plate 22 increases in a radial direction outwards. In such an embodiment, it is not always necessary for there to be a contact surface between the blade top and the bottom of the recess in a radial direction, even during operation.

Figure 4:
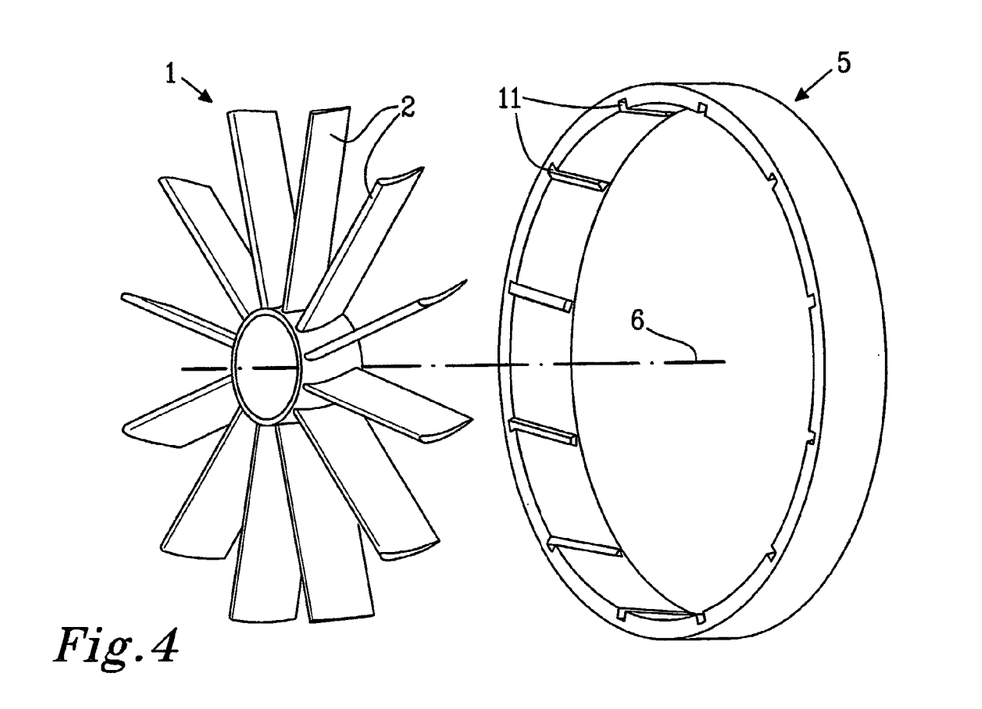
FIG. 4 is a perspective view of a rotor provided with blades and a ring provided with recesses.
Figure 5:
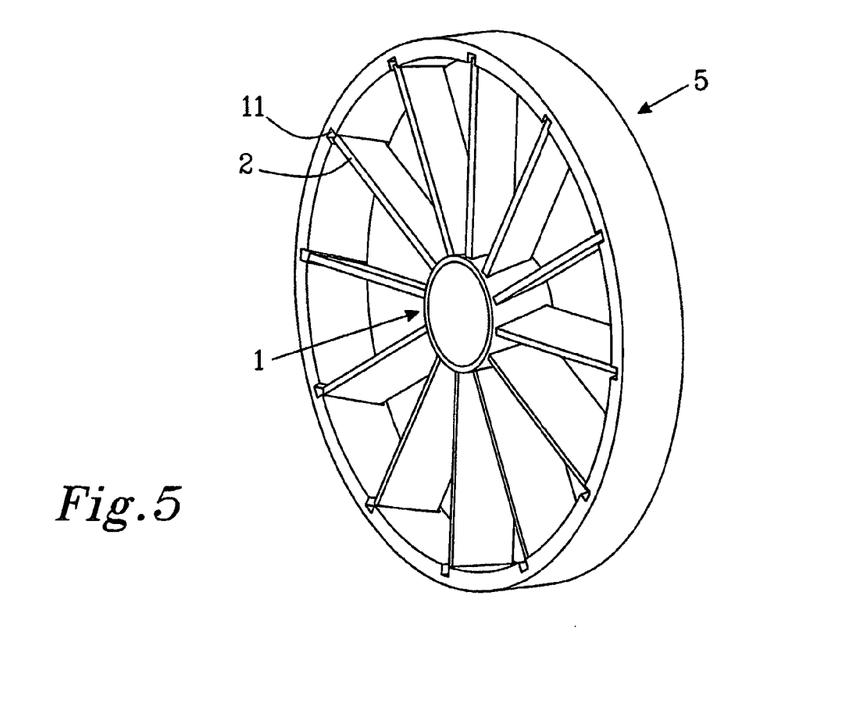
FIG. 5 is a perspective view of the rotor and the ring in FIG. 4 in assembled state.

In addition, the top plate 22 can be used to ensure that the forces transferred between the blades 2 and the ring 5 when the wheel rotates are such that the ring 5 tends to remain in and/or is guided into the required position in an axial direction in relation to the blades 2. The design of the top plate controls the contact tension between the blade and the ring, and this, in turn, makes it possible to control the friction and damping characteristics of the wheel. With the use of a ring 5 provided with recesses 11 that are angled in relation to the axis of rotation 6, and a set of blades 2 and a ring 5 that mean that the blade tops 4 are arranged in recesses 11 when the wheel is stationary, as illustrated in FIGS. 4 and 5, assembling and dismantling the ring 5 can be carried out by the ring 5 being screwed on or off the blade tops 4. In such a case, the shape of the recesses 11 and the blade tops 4 are matched to each other and the blade tops 4 and suitably the recesses 11 are helical so that when the ring 5 and the rotor 1 are turned in opposite directions around the geometrical longitudinal axis 6, the blades 2 will be screwed into the recesses 11 for assembly and will be screwed out of the recesses 11 for disassembly.

Figure 6A:
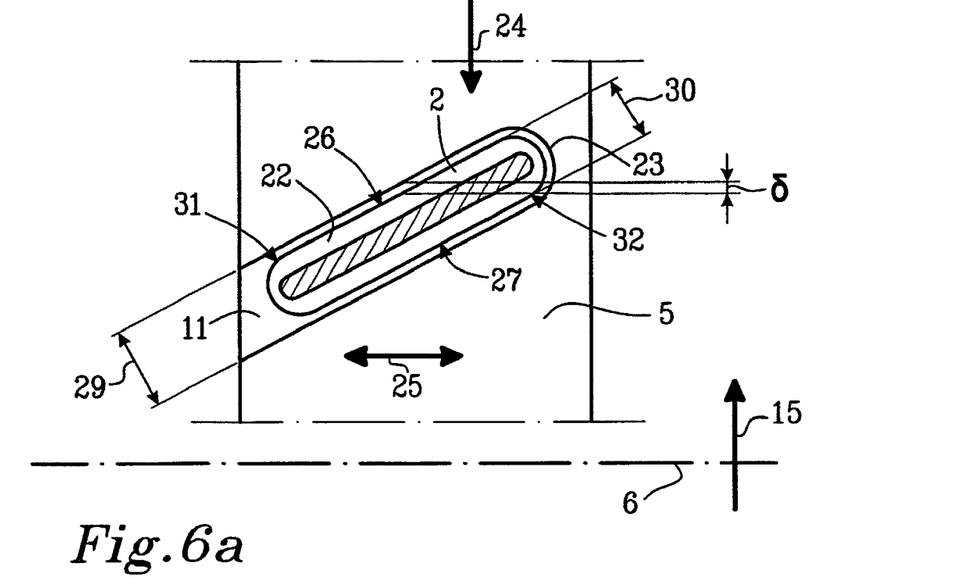
FIG. 6a is a sectioned view along the line VI-VI in FIG. 3a, FIG. 6b is a view corresponding to FIG. 6, showing a state in which the wheel according to the invention is rotating.

In order to achieve the correct position for the ring in relation to the rotor 1 and the blades 2, the recesses 11 can have a rear wall 23, see FIG. 6, that prevents further axial movement of the ring 5 in relation to the blades 2 in the direction in which it is being screwed.

Alternatively, one or more locking washers or the like can be used to position the ring and the blade tops in relation to each other in an axial direction. Other ways of locking the ring in position axially are also possible, as the contact surface, or in other words the locking surface, between the ring and the respective blade top is located axially.

FIG. 6a, which is a section view from FIG. 3a, shows the blade in cross-section with the projecting parts 17, 18 forming the top plate 22 that is arranged in the recess 11. In this case, when the recess 11 is arranged at an angle in relation to the geometrical axis of rotation 6 and the blade 2 is similarly arranged at an angle and/or the blade 2 has a blade top 4 that is twisted in order to match the position of the recess 11, the projecting parts 17, 18 will project out from the blade not only in a tangential direction 24, but also in the longitudinal direction 25 of the ring. As described above, each top plate 22 is suitably-helical, and the respective recess 11 has preferably a corresponding helical shape.

Figure 6B:
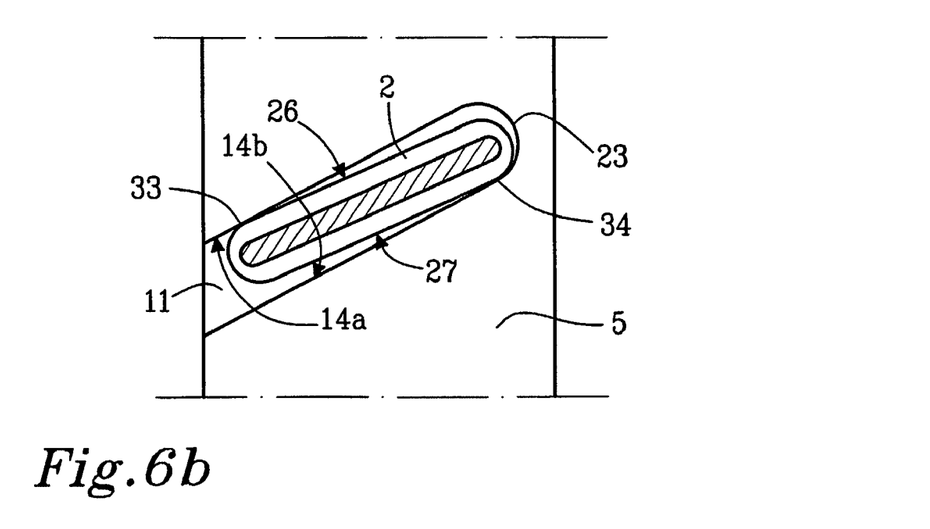

It is possible to design the blade tops 4 and the recesses 11 in the ring 5 in such a way that, in an idle position when the rotor 1 is not rotating, there is a clearance δ between each blade top 4 and the corresponding recess 11 in a tangential direction 24. When the rotor 1 rotates, the angled blades 2 will twist around their own longitudinal axis (with different degrees of twisting for different speeds of rotation of the rotor) which means that the front edge 26 and the back edge 27 of the blade tops 4 will be moved forwards, that is in the direction of rotation 15, and backwards, that is in a direction that is counter to the direction of rotation 15, respectively. By matching the width 29 of the recess 11 and the thickness 30 of the blade top 4 to each other and to the speed of rotation in question, a part 31 on the front side of the blade 2 and a part 32 on the back side of the blade can come into contact with the front side wall 14a and the back side wall 14b of the recess 11 respectively as a result of the twisting around the longitudinal axis of the blade 2. As illustrated in FIG. 6b, as a result of the twisting of the blade, two contact zones 33, 34 will arise between the blade and the side walls 14a, 14b of the recess during operation. At the front contact zone 33 between the front side of the blade and the front side wall 14a of the recess 11, at least a part of the force transferred between the blades 2 and the ring 5 can be transferred for causing the ring 5 to rotate. In order to achieve a smoother and more accommodating engagement between the blades 2 and the ring 5 when the rotor 1 is started up, one or more dampers can be arranged between the ring and each blade top. In an embodiment in which the force is transferred between the blade 2 and the ring 5 at the abovementioned contact zone 33 in the respective recess 11, a damper can be arranged between the front side wall surface 14a of the recess 11 and the blade top 4. The damper is suitably attached to the ring 5 or constitutes a part of the ring 5. By the use of dampers, the occurrence of vibrations can be reduced.

Figure 7:
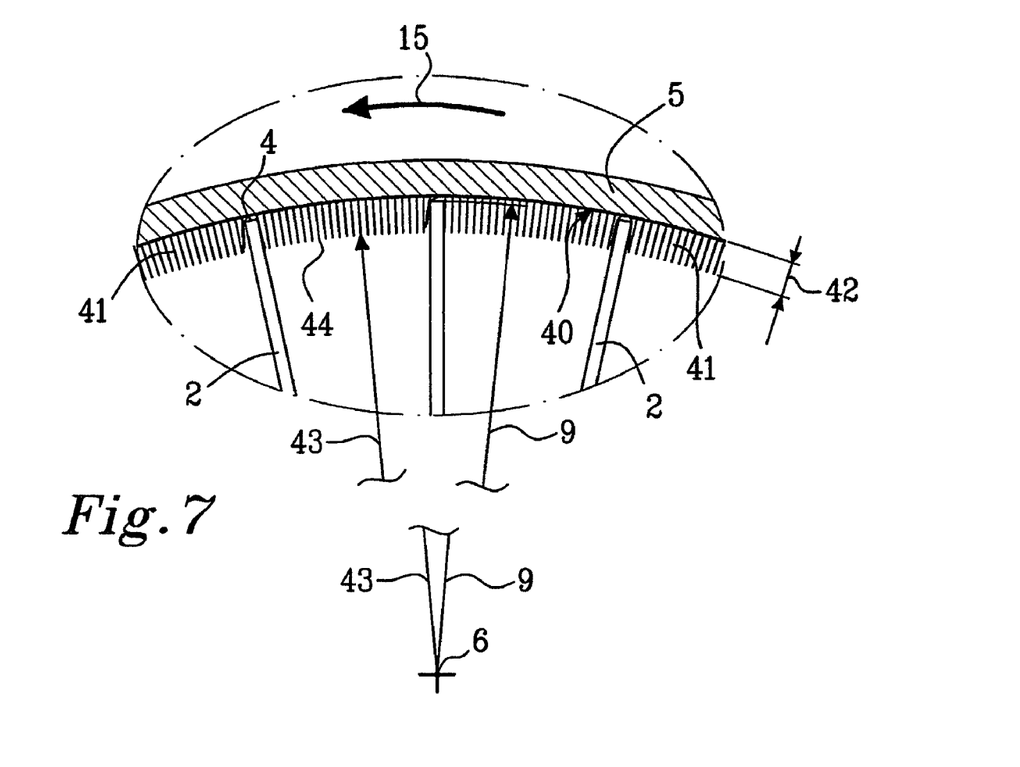
FIG. 7 shows a view corresponding to FIG. 2b, showing a variant of the invention in which the ring is provided with bristles.
Figure 8:
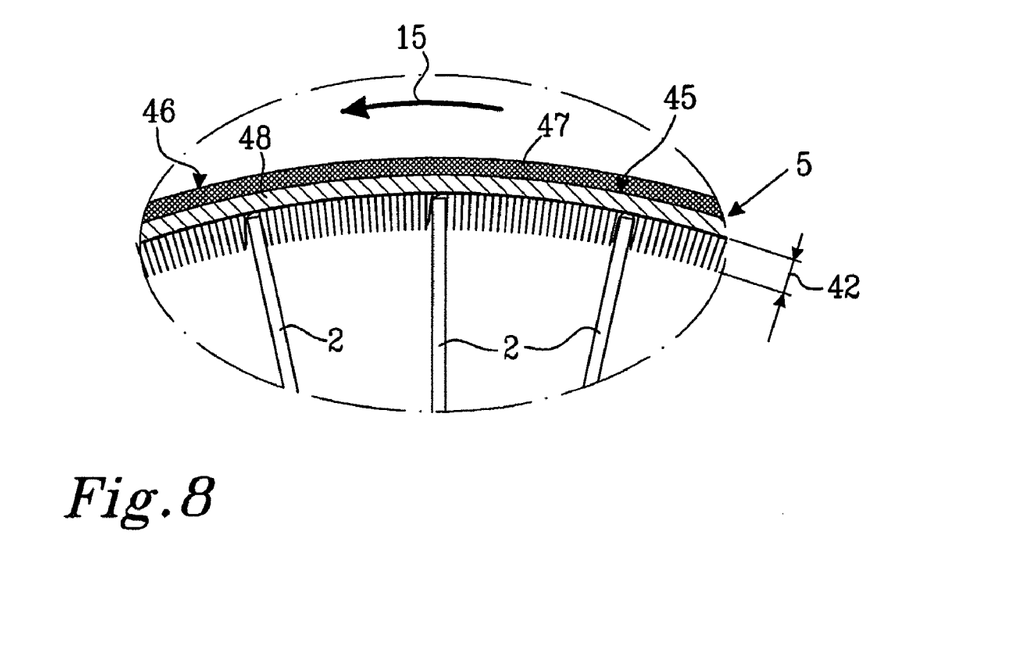
FIG. 8 shows a view corresponding to FIG. 2b, showing an additional variant of the invention.

In an additional preferred embodiment of the invention illustrated in FIGS. 7 and 8, the internal surface 40 of the ring 5 has bristles 41 extending radially inwards for the transfer of force between the blade tops 4 and the ring 5. By the use of bristles 41, a relatively smooth movement of the ring 5 can be achieved when the rotor 1 rotates. The bristle fibers 41, that suitably have a length 42 that means that the bristle fibers and the blade tops 4 overlap each other when they are viewed in a tangential direction when the rotor 1 is stationary, have a damping effect when the rotor 1 is started, as the rotor 1 and the blades 2 are able to rotate somewhat in relation to the ring 5. The bristle fibers 41 can have a length 42 in the range 1-10 mm, and preferably 3-7 mm, in order for the bristle fibers 41 to be able to contribute to the rotation of the rotor 1 being transferred to the ring 5. Such bristle fibers 41 can be manufactured from a metallic material or carbon fiber and can have a thickness in the range 0.1-1 mm, preferably 0.3-0.7 mm. The distance 9 between the geometrical longitudinal axis 6 and the blade tops 4 preferably exceeds the radial distance 43 between the geometrical longitudinal axis 6 and the bristle fiber tips 44, so that the blade tops 4 and the bristle fibers 41 overlap each other viewed in a tangential direction, even when the rotor is stationary. The overlap can be of the order of 1-10 mm. The bristles can be arranged locally at each blade top position or along essentially the whole of the internal surface of the ring.

It should be emphasized that the use of bristles and recesses can be combined and that, in such a case, the bristles are arranged at and/or in the recesses. The bristle fibers can be arranged in such a way that they are caused by the blade tops to make bridging contact between the recess and the blade top in a tangential direction when fitting the blade tops in the recesses. Other possible materials that can be used at the interface with the blades are various types of rubber. An internal rubber ring can be arranged to transfer the force from the blades so that the ring is caused to rotate when the wheel rotates. Rubber material could also be used in combination with recesses in order to ensure a smooth contact between the blades and the ring locally at the recesses.

In all the embodiments, the blades 2 can be arranged to cause the ring 5 to rotate via contact with the ring 5 in a radial direction when the wheel rotates. Both in an embodiment in which the ring 5 is provided with internal bristles 41 and in an embodiment in which the ring is provided with recesses 11 for receiving the blade tops 4, the blades 2 can be arranged to cause the ring 5 to rotate upon rotation of the wheel via contact in a tangential direction and/or in a radial direction. When recesses are used, the blade can be arranged to cause the ring to rotate via direct contact with the side wall and/or the bottom surface of the recess. It is also possible for bristles or a damper of another kind to be arranged between the ring and each blade. When only bristles are used to transfer the force between the blades and the ring, the transfer of force to the ring is carried out in a tangential direction via the internally-arranged bristles. In an embodiment, the external side 45 of the ring can be coated with a reinforcing material 46, such as a fiber material, in order to withstand the loads and temperatures that occur during operation. A continuous layer 46 around the circumference of the ring means that the ring can be said to comprise two components 47, 48; an outer ring component 47 and an inner ring component 48 which together form the ring 5. See FIGS. 2a, 2b and 8. The two ring components 47, 48 can be joined together by the use of any conventional method. For example, a press fit can be used to join the two components together. As the outer ring component is usually manufactured from a more rigid material than the inner ring, the inner ring component will expand more than the outer ring component which will result in a stronger engagement as the speed of rotation increases.

The outer ring component 47 is preferably manufactured from a material that has a high specific elasticity module, that is a high elasticity module in relation to the density, and a high resistance to tension loading. What is important is that the specific elasticity module E/δ for the outer ring component 47 exceeds the specific elasticity module of the blades and/or the rotor. The elasticity module preferably exceeds $10^8$ Pa, and in certain applications the specific elasticity module E/δ is suitably in the range $1 \times 10^8$ to $3 \times 10^8$ Pa, while the inner ring component 48 closest to the blade tops can be manufactured from a material with a lower specific elasticity module E/δ in the range $0.1 \times 10^8$ to $1 \times 10^8$ Pa. A suitable material for the outer ring component 47 is, for example, carbon fiber. Suitable materials for the inner ring component 48 are, for example, titanium, titanium-based alloys, steel, aluminium and carbon fiber. The outer ring component 47 can have a thickness in the range 1-10 mm, preferably 2-6 mm. The inner ring component 48 can have a thickness in the range 0.5-6 mm, preferably of the order of 1 mm. Other thicknesses for the two ring components 47, 48 are, however, possible and of course the choice of thicknesses will depend upon the diameter of the wheel, the material in the wheel, the speed of rotation and other operating conditions, etc.

When the ring 5 is a two-component ring which, in addition, is provided with recesses 11 on the inside to receive the blades 2, as illustrated in FIGS. 2a and 2b, the inner ring component 48 can suitably have a thickness that exceeds the depth of the recess so that the outer ring component 47 can be designed with a complete and smooth internal surface where it adjoins the inner ring component 48.

Example of an Embodiment

The ring has an internal diameter $\varnothing_i \approx 400$ mm and an external diameter $\varnothing_i \approx 420$ mm, and a length $L \approx 70$ mm. The ring comprises an outer ring component and an inner ring component each with a thickness $t \approx 5$ mm. The outer ring is manufactured from a carbon fiber material that has an elasticity module $E \approx 3 \times 10^{x1}$ Pa and a density $\delta \approx 1500$ kg/m$^3$. The inner ring component is manufactured from titanium that has an elasticity module $E \approx 1.1 \times 10^{11}$ Pa and a density $\delta \approx 4500$ kg/m$^3$. The clearance $\delta$ between the blade tops and the ring in a radial direction is approximately 50 μm when the rotor is not rotating.

The invention claimed is:

1. A wheel for a rotating flow machine, comprising:
   a rotor on which a plurality of blades are arranged projecting radially from the rotor, with each blade having a root attached to the rotor and a blade top; and
   a ring arranged concentrically in relation to the rotor outside the blade tops in such a way that the ring and the blades overlap each other when the ring and the blades are viewed in a radial direction, which ring is arranged to be caused to rotate by the blades when the rotor rotates, wherein an extent of the blades in a radial direction and an internal dimension of the ring are matched to each other in such a way that there is a clearance between each blade top and the ring in a radial direction when the rotor is not rotating,
   wherein the internal surface of the ring has bristles extending radially inwards, for transferring force between the blade tops and the ring via the bristles.

2. The wheel as claimed in claim 1, wherein the clearance exceeds 5 μm.

3. The wheel as claimed in claim 1, wherein the clearance exceeds 10 μm.

4. The wheel as claimed in claim 1, wherein the clearance exceeds 30 μm.

5. The wheel as claimed in claim 1, wherein the clearance is less than 100 μm.

6. The wheel as claimed in claim 1, wherein the ring is provided with internal recesses for receiving the blade tops in various positions around a circumference of the ring and for transferring force between the blade tops and the ring.

7. The wheel as claimed in claim 6, wherein each blade is arranged in a respective recess in such a way that at least a part of the blade top and a side wall surface of the recess overlap each other when the blade top and the side wall surface are viewed in a tangential direction when the rotor is not rotating.

8. The wheel as claimed in claim 6, wherein each blade is arranged to cause the ring to rotate when the wheel rotates via contact with a side wall surface of a respective recess.

9. The wheel as claimed in claim 6, wherein each blade is arranged to cause the ring to rotate when the wheel rotates via contact with a bottom surface of a respective recess.

10. The wheel as claimed in claim 6, wherein one or more dampers are arranged between a side wall surface in each recess and the respective blade top.

11. The wheel as claimed in claim 1, wherein, when the wheel rotates, bristle fibers in the bristles are arranged to be compressed between the ring and the blade tops.

12. The wheel as claimed in claim 1, wherein fibers of the bristles are manufactured from a metallic material.

13. The wheel as claimed in claim 1, wherein fibers of the bristles are manufactured from carbon fiber.

14. The wheel as claimed in claim 1, wherein fibers of the bristles have a length in the range 1-10 mm, preferably 3-7 mm.

15. The wheel as claimed in claim 1, wherein fibers of the bristles have a thickness in the range 0.1-1 mm, preferably 0.3-0.7 mm.

16. The wheel as claimed in claim 1, wherein each blade is arranged in relation to the bristles in such a way that at least a part of the blade top and the fibers of the bristles overlap each other when the blade top and the bristle fibers are viewed in a tangential direction when the rotor is not rotating.

17. The wheel as claimed in claim 1, wherein each blade is arranged to cause the ring to rotate when the wheel rotates via contact with the ring in a radial direction.

18. The wheel as claimed in claim 1, wherein each blade is arranged to cause the ring to rotate when the wheel rotates via contact with at least one of the ring and bristles arranged on the ring in a tangential direction.

19. The wheel as claimed in claim 1, wherein an external side of the ring is coated with a fiber material.

20. The wheel as claimed in claim 19, wherein a main direction of fibers in the fiber material is in the direction of a circumference of the ring.

21. The wheel as claimed in claim 1, wherein the ring comprises two components forming an outer ring component and an inner ring component.

22. The wheel as claimed in claim 21, wherein the outer ring component is manufactured from a material that has a specific elasticity module $E/\delta$ in the range $1 \times 10^8$ to $3 \times 10^8$ Pa.

23. The wheel as claimed in claim 21, wherein the inner ring component is manufactured from a material that has a specific elasticity module $E/\delta$ in the range $0.1 \times 10^8$ to $1 \times 10^8$ Pa.

24. The wheel as claimed in claim 21, wherein the outer ring component is manufactured from a carbon fiber material.

25. The wheel as claimed in claim 21, wherein the inner ring component is manufactured from a metallic material.

26. The wheel as claimed in claim 21, wherein the inner ring component is manufactured from titanium.

27. The wheel as claimed in claim 1, wherein one or more dampers are arranged between the ring and each blade top.

28. The wheel as claimed in claim 27, wherein each damper is attached to the ring or comprises a part of the ring.

29. An aircraft engine comprising a wheel as claimed in claim 1.

* * * * *